Patented Jan. 1, 1946

2,392,073

UNITED STATES PATENT OFFICE 2,392,073

PIGMENTS

Andries Voet, East Orange, N. J., assignor to General Printing Ink Corporation, New York, N. Y., a corporation of Delaware No Drawing. Application August 11, 1941,
Serial No. 406,439

10 Claims. (Cl. 106—304)

This invention relates to iron blue pigments, and more particularly to the manufacture of highly alkali resistant iron blues.

The iron blues, known variously as Prussian blue, milori blue, Chinese blue, bronze blue, etc., are precipitated iron ferrocyanide pigments of varying compositions depending on the method of manufacture and the materials used. Two general types are the potash blues, and the so-called soda blues. Both types are compounds in the nature of ferric ferrocyanides. The former class, i. e., the potash blues are formed by the reaction of potassium salts and are generally acknowledged to be superior in pigment characteristics to the soda blues, but are also more expensive to manufacture. Sodium salts, when used in manufacturing iron blues, are usually mixed with ammonium salts, which produces a pigment approaching in quality that of the potash blues.

In the manufacture of iron blues, solutions of a soluble alkali ferrocyanide and a soluble ferrous salt, are brought together in a tank with agitation. The result is the formation of a white or bluish white precipitate—commonly called the "white paste"—of ferrous alkali ferrocyanide. This is converted by oxidation to a final darker blue pigment whose exact composition is unknown, and probably varies considerably as a result of the conditions of manufacture, but is generally referred to as ferric ferrocyanide.

The resulting pigment is a strong color, relatively inexpensive as strong colors go, and consequently finds a wide use in paints, printing inks and the like.

Many printed and painted surfaces are subject to exposure to alkaline materials after fabrication and must be able to withstand such exposure without undue fading or discoloration. Thus, inks for soap wrappers, for paper boxes to be sealed with alkaline adhesives, and paints to withstand washing with alkaline soaps, must utilize pigments which will resist the action of these elements.

In the past the utility of the otherwise satisfactory iron blues has been seriously impaired by their lack of alkali resistance. Solutions of caustic alkali as such, or formed by hydrolysis from soaps and the like, rendered prints unsightly and caused fading, and brown, dirty looking discolorations.

Attempts which have been made in the past to overcome this difficulty, and to produce alkali resistant iron blues, have met with some minor success, and slight improvements in this respect have been made. So-called alkali resistant iron blues are now made and sold on the market as such.

However, none of the so-called alkali resistant iron blues produced in the past effectively overcame the difficulty to the extent that the resulting ink or paint is sufficiently alkali resistant to be used widely on soap wrappers, and in no case can such use be made without the additional protection of an inner wrapper, or other auxiliary guard against fading and discoloration.

It is therefore an object of my invention to produce iron blue pigments of superior alkali resistance.

It is a further object to produce such pigments by the addition of controlling constituents and the proper sequential addition of the reacting materials whereby they are combined in such a way as to impart greatly increased alkali resistance.

Still another object is to produce such pigments to have the desired alkali resistance by the use of small quantities of nickel and/or cobalt added in predetermined amount as controlling constituents and with proper sequential addition of the reacting materials whereby they are combined in such a way as to impart a greatly increased alkali resistance as compared to prior pigments.

A still further object is to produce such a pigment by a new process of preparation, effective to bring about enhanced alkali resistance.

A still further object is to prepare an iron blue pigment by a reverse precipitation process, using alkali ferrocyanide in excess and adding it to the ferrous sulfate solution, the latter containing in addition small quantities of soluble nickel and/or cobalt salts, followed by a heat treatment of the resulting white paste in the presence of acid, to produce a high yield of an iron blue pigment of excellent shade and working properties, and one possessed of exceptional resistance to alkali.

In the past, it has been the practice in the manufacture of iron blues, to make up separate solutions of copperas, (ferrous sulfate) and of an alkali ferrocyanide, and to add the copperas solution to the alkali ferrocyanide solution, utilizing an excess of ferrous sulfate to insure complete reaction of the more expensive ferrocyanide material. Under previous practices if the blue were made by the reverse of the above process, that is, adding the ferrocyanide to the ferrous sulfate, in that order, this reverse order resulted in a lower yield and a dull reddish-blue pigment and this reaction therefore was not desired to be used.

It has been noted that when a small amount of nickel or cobalt salt was added to the ferrous sulfate solution before precipitation it seemingly entered into the reaction and gave blues of slightly increased resistance to soap and alkali. This increase was noticeable but was not a sufficient increase in alkali resistance such as would cause the blue on wrappers which were to come directly in contact with soap or with the alkali silicate or latex solutions used in many pasting operations to stand up in any markedly superior manner in the presence of the alkali.

For purposes of description, my invention will be described with reference to the manufacture of soda blues because blues made by the use of soda constitute by far the largest tonnage in the present day iron blue production.

In carrying out my invention, I make up two solutions as is common practice, the so-called copperas, or other soluble ferrous salt solution, and the alkali ferrocyanide solution. To the copperas solution is added a quantity of ammonium sulfate, and sufficient sulfuric acid to insure the solution of any ferric oxide present in the copperas. In this solution I also include a small quantity of a soluble nickel or cobalt salt such as nickel or cobalt sulfate in sufficient amount to yield between about .5% and 5.0% nickel or cobalt or a mixture thereof, in the finished blue. The second solution is made up of sodium ferrocyanide (yellow prussiate of soda) dissolved in water.

The solution of alkali ferrocyanide is made up in such amount that there is an excess of ferrocyanide over the molecular amount required to combine with the ferrous salt, when the two solutions are combined as hereinafter described.

According to my process, I add the alkali ferrocyanide solution to the ferrous salt solution containing the nickel or cobalt salts and other ingredients mentioned above. The mixing is carried out slowly in the cold under agitation, and a white precipitate forms whose exact composition is unknown, and which probably is a complex material, but is commonly thought to be largely ferrous ferrocyanide, mixed with a certain amount of ferrous alkali ferrocyanide.

In my process, some of the alkali ferrocyanide probably reacts with the nickel or cobalt forming nickel or cobaltous ferrocyanide or perhaps nickel or cobaltous alkali ferrocyanide which is precipitated in intimate admixture with the majority of the iron ferrocyanide compound.

The reactions at this stage may proceed somewhat as follows:

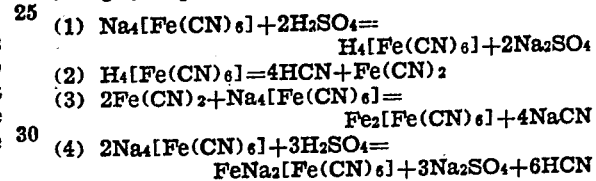

The reactions given above are merely illustrative of some of the reactions that probably take place. It is very likely that other more complex reactions also occur and as said above, it is by no means certain just what the composition of this white paste precipitate is. After the precipitate has completely formed, acid is added, for example, sulfuric acid, and the mixture is boiled for a short period not to exceed about 20 minutes, 10 minutes usually being sufficient, after the white paste has formed.

This boiling with acid is an important feature of my invention, and it is believed that it is during this boiling period that the enhanced alkali resistance is imparted to the white paste, which carries over to the finished pigment after oxidation. It has heretofore been understood that boiling with acid would sharply decrease the yield, and would reduce the color strength far below that required for a merchantable pigment. However, I have found that when small percentages of nickel or cobalt are present in the complex precipitate and the mixing of the reactive ingredients is controlled as described the color does not become reddish and dirty during boiling, but remains clean and brilliant blue.

The acid serves to promote the decomposition of the excess alkali ferrocyanide which must be removed before oxidation can be carried out. This decomposition releases hydrocyanic acid gas and forms ferrous cyanide in solution. The latter in turn combines with additional alkali ferrocyanide molecules to precipitate molecules of ferrous ferrocyanide, and probably also of ferrous alkali ferrocyanide upon and about the major precipitate of these same constituents.

The reactions upon boiling with acid are thought to proceed somewhat as follows:

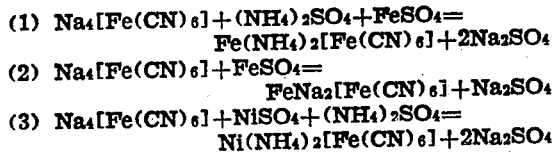

The ammonium radical, in all probability enters into the reaction also, and forms double cyanides with the iron and/or sodium. The exact nature and extent of these reactions are not completely understood, but it is fairly evident that the end products are extremely complex and vary sharply with variations in methods and conditions of preparation. At any rate, when the reactions are caused to occur as described and in the sequential order stated such highly improved alkali resistant blue is produced.

The ferrous ferrocyanide or ferrous alkali ferrocyanide thus formed appears to impart exceptional alkali resistance to the white paste and to the final pigment, only provided that a nickel or cobalt salt has been used with the iron salt in the initial precipitation. The boiling is critical, but if continued for too long a time destroys the color strength of the resulting pigment. Up to 20 minutes at boiling temperatures apparently is not harmful, while the mass can be held for longer periods at lower temperatures.

After boiling with acid the oxidizing agent is added. This may be sodium or potassium chlorate, sodium dichromate, or any of the well known oxidizing agents, commonly used in iron blue manufacture. The mass is again boiled until oxidation is complete, and then decanted, washed, filter pressed and dried in the usual way.

As mentioned above, the normal process of manufacturing iron blues avoided use of an excess of alkali ferrocyanide, as this material is appreciably more expensive than the soluble ferrous salt, and moreover the yield obtained is much lower than with the usual excess of ferrous salt.

For some reason which I am unable to explain, the yields obtained in the practice of my invention with the described procedure and sequential reaction of the ingredients are, surprisingly, relatively higher than those which are obtained in the standard process. This increase in yield is of such an extent that the higher materials cost due to the use of the excess alkali ferrocyanide is more than offset, and the blue produced by this process is even less expensive to manufacture than the standard blues, in spite of the high materials cost. As an illustration of this, it has been found in ordinary practice that the percentage yield of the regular soda iron blues prepared with an excess of ferrous sulfate averages around 58.5% based on the alkali ferrocyanide, while in the process of this invention, using an excess of alkali ferrocyanide, a yield of 61.6%, based on the same standard has been obtained with the superior characteristics referred to.

A very satisfactory blue pigment has been made according to the following procedure:

Solution 1

| | Grams |
|---|---|
| Ammonium sulfate | 11 |
| Ferrous sulfate (copperas) | 34 |
| Nickel sulfate | 2 |
| Sulfuric acid (conc) | 1.9 |
| Water | 225 |

Solution 2

| | Grams |
|---|---|
| Sodium ferrocyanide | 55.5 |
| Water | 340 |

Solution #2 was added slowly to Solution #1 at room temperature (about 25° C.). The resulting white paste was heated to a boil, then a solution of 7.5 grams of concentrated sulfuric acid dissolved in 20 grams of water was added, and the mass boiled for 10 minutes. Then a solution of 2.7 grams of sodium chlorate dissolved in 13 grams of boiling water was added, and the solution stirred for 4 hours. The pigment was then decanted, filtered, washed and dried.

The iron blue pigment prepared according to the above procedure contained 1.4% nickel and was equal in all respects to the standard blues in color, etc., and was approximately 10 times as high in alkali resistance as the standard blues, and was between 2 to 4 times as alkali resistant as so-called alkali resistant iron blues at present on the market.

This superiority in alkali resistance is illustrated in a comparative way by a drastic empirical test in Table I, in which one gram samples of various iron blues were pulverized and screened through a 120 mesh screen so that all were reduced to a uniform particle size. The samples were then immersed in 50 cubic centimeters of water in separate containers (each containing a drop of wetting agent to facilitate thorough wetting). Constant stirring was applied throughout the whole procedure. After complete wetting, 50 cc. of a 10% solution of NaOH was added and the time necessary to change the color to brown was observed. The change in color, indicating complete decomposition is very sharp. The temperature of testing was 23° C.

TABLE I

*Iron blue pigments immersed in a 5% NaOH solution*

| Pigment sample | Time in minutes to change color |
|---|---|
| Commercial iron blue | 2.5 |
| Alkali resistant blue No. 1 | 6. |
| Alkali resistant blue No. 2 | 10.5 |
| Alkali resistant blue No. 3 | 11.5 |
| Blue of present invention | 25. |

In the above the pigments designated as Nos. 1, 2 and 3 were commercial products known respectively as Kentucky No. 4025, Kentucky No. 4026 and Ansbacher Siegel Alkiron blue, for each of which some increase in alkali resistance is claimed as compared with the regular "Commercial iron blue" which is not sold as being alkali resistant.

When tested according to the standard drawdown method of testing alkali resistance used in the pigment industry, the new blues of this invention ranged between about 3 and 6 times as high in alkali resistance as so-called alkali resistant iron blues at present on the market, depending on the type of paper used in making the test, as illustrated in Table II.

In this test pigment is mulled with an equal quantity of No. 1 litho varnish until smooth. Drawdowns are then made on paper, and allowed to dry at room temperature for 48 hours. The drawdown is then cut out and immersed in the testing liquid and the time necessary for discoloration to start is noticed. As the testing liquid, sodium hydroxide is usually used in strengths of 2%, 3%, or 5%.

When tested according to the above procedure, using a 3% sodium hydroxide solution as the testing liquid, the following comparative results were obtained when a comparison was made on various types of paper with a so-called alkali resistant iron blue sold commercially and containing nickel and cobalt.

TABLE II

*Drawdowns on paper tested with 3% NaOH solution*

| Paper type | Time in minutes to start discoloration | | |
|---|---|---|---|
| | Commercial alk. resist blue | Alk. resist blue of this invention | Improvement |
| | | | *Per cent* |
| Supercalendered | 16 | 56 | 350 |
| Half tone news | 19 | 75 | 400 |
| Textbook | 12 | 48 | 400 |
| Coated | 17 | 103 | 600 |

This test is much more severe than any pigment would probably encounter in actual use and has been arbitrarily selected for comparison on that account.

Some pigments must also be given a soap test if they are sensitive to oleic acid. Iron blues, however, are completely inert to oleic acid, and thus need not be tested directly with soap, for as the caustic is the ingredient of the soap which affects the iron blue, a caustic solution test may be made equivalent to, or more severe than, the soap test for this pigment, and moreover yields much more accurate comparative results.

In general, the percentage of nickel and/or cobalt salt to be used can vary from about 0.5% up to about 5.0% in the final pigment. An increase in percentage of this auxiliary metal, or admixture thereof, increases the alkali resistance of the pigment, but renders it somewhat weaker, and higher concentrations produce a harder grinding pigment. I have found that a final nickel and/or cobalt concentration of about 1.4% produces a blue having the alkali resistance indicated in Tables I and II and also adequate strength and ease of grinding. Either nickel or cobalt alone will produce equally satisfactory alkali resistance, as will also a mixture of these two metals. As nickel is at present the cheaper of the two, I prefer to prepare my blues using this metal to the exclusion of the more expensive cobalt as long as this difference in cost obtains.

An excess of alkali ferrocyanide has been found essential for attaining the desired end results when it is added to the ferrous salt solution in the reverse order in the use of my process. The reasons why these operations impart alkali resistance to the pigment are not known, but I believe that when the excess alkali ferrocyanide is decomposed by the acid, the ferrous ferrocyanide thus formed may exist in a different physical state from that obtained by the ordinary precipitation method, and that the material in this state is itself alkali resistant and forms on and about the remaining material a thin film, coating the particles and protecting them in some way during the subsequent oxidation to produce a final product of enhanced alkali resistance. For purposes of simplicity herein this second precipitate is referred to as the secondary paste and is believed itself to be markedly more alkali resistant than the first precipitate of the present process.

The percentage of the excess of the alkali ferrocyanide needed does not appear to be extremely critical so long as it is sufficient to give the desired control of the reactions. It has been found that for satisfactory operations, the excess should be substantial because of the fact that the reagents used are of technical grade and contain impurities which make it impractical to calculate quantities to precise amounts. In commercial operations an amount of alkali ferrocyanide of 12-16% in excess of the molecular amount theoretically required to complete the reaction gives satisfactory results; and with commercial reagents available to be used, an excess of not less than 5% has been found needed and, generally, an excess of more than 20% has been found unnecessary and undue excess should be avoided to prevent decrease in efficiency and because such greater amounts produce the weak, hard and greenish pigments which are unsatisfactory, and of course, add to the danger of the operation because of the development of greater quantities of the poisonous hydrocyanic acid gas. The smallest excess that can be practically used is, of course, the most economical, as the alkali ferrocyanide is the most expensive of the ingredients used.

Finally, the heat treatment after precipitation is essential. It is at this stage that the protective coating of the special ferrous ferrocyanide or ferrous alkali ferrocyanide (white paste) is formed, which is believed to be in such a physical condition as to impart unusually high alkali resistance, both to the white paste, and to the finished pigment after subsequent oxidation. A short period of boiling is sufficient, and when using steam at 130 lbs. pressure for heating, can vary from about 1 to 20 minutes, while about 10 minutes under these conditions usually produces a satisfactory product. Periods of boiling longer than 20 minutes under the described conditions appear to reduce the color strength of the resulting pigment.

That some reaction other than a mere additive effect takes place is illustrated in Table III in which the alkali resistance according to the above test is shown for pigments made using (1) the regular process—excess of ferrous salt and adding ferrous salt to the alkali ferrocyanide—(2) the regular process, in which nickel or cobalt are added, (3) the reverse process—using an excess of alkali ferrocyanide and adding the ferrocyanide to the ferrous salt, (4) using the reverse process with with nickel or cobalt incorporated, in amount approximating that present in test 2.

TABLE III

*Drawdowns tested with 3% NaOH solution*

| | Type pigment | Minutes to start fading |
|---|---|---|
| 1 | Regular process alone | 2 |
| 2 | Regular process plus Ni and Co (1.1-1.3%) | 8-10 |
| 3 | Reverse process alone | 3-5 |
| 4 | Reverse process plus Ni (or Co) (1.2%) | 40 |

The oxidation of the white paste is carried out in the usual way using any of the common oxidizing agents known for this purpose, including sodium chlorate, sodium dichromate, and the like.

The usual modifications generally incident to iron blue manufacture can be practiced in my invention to vary the texture, shade and other qualities of the pigment, without departing from the scope of my invention, and these modifications are well known and recognized by those skilled in the art.

Therefore, while the above description sets forth a preferred embodiment of the practicing of my invention, it is to be understood that departures may be made therefrom within the scope of the invention as described and claimed.

What is claimed is:

1. Method of preparing an alkali resistant iron blue pigment, which comprises adding to a ferrous salt solution a small quantity of a soluble salt of a metal selected from the group consisting of nickel and cobalt, adding an excess of an alkali ferrocyanide solution to the ferrous salt solution in that order, to form a white paste precipitate of ferrous alkali ferrocyanide, adding sulfuric acid thereto and boiling in the presence of said acid, oxidizing the white paste to form a ferric ferrocyanide type pigment modified with a metal selected from the group consisting of nickel and cobalt, whereby to impart high alkali resistance to the pigment.

2. Method of preparing an alkali resistant iron blue pigment which comprises preparing a first solution comprising a soluble ferrous salt and a small quantity of a soluble salt of a metal selected from the group consisting of nickel and cobalt; preparing a second solution comprising an alkali ferrocyanide in a quantity amounting to an excess of not less than 5% of that required to react with all the metal ions in said first solution; adding said second solution to said first solution, to form a white precipitate, adding sulfuric acid thereto and boiling in the presence of said acid to destroy the excess alkali ferrocyanide, and to precipitate therefrom a secondary white paste; oxidizing the composite white paste to form a ferric ferrocyanide type blue pigment modified with a metal selected from the group consisting of nickel and cobalt, whereby to impart high alkali resistance to the pigment.

3. Method of preparing an alkali resistant iron blue pigment which comprises preparing a first solution comprising a soluble ferrous salt and a small quantity of a soluble salt of a metal selected from the group consisting of nickel and cobalt; preparing a second solution comprising an alkali ferrocyanide in a quantity amounting to an excess of between about 5 and 20% of that required to react with all the metal ions in said first solution; adding said second solution to said first solution, to form a white precipitate, adding sulfuric acid thereto and boiling in the presence of said acid to destroy the excess alkali ferrocyanide, and to precipitate therefrom a secondary white paste; oxidizing the composite white paste to form a ferric ferrocyanide type blue pigment modified with a metal selected from the group consisting of nickel and cobalt, whereby to impart high alkali resistance to the pigment.

4. Method of preparing an alkali resistant iron blue pigment which comprises preparing a first solution comprising a soluble ferrous salt and a small quantity of a soluble salt of a metal selected from the group consisting of nickel and cobalt; preparing a second solution comprising an alkali ferrocyanide in a quantity amounting to an excess of between about 12 and 16% of that required to react with all the metal ions in said first solution; adding said second solution to said first solution, to form a white precipitate, adding sulfuric acid thereto and boiling in the presence of said acid to destroy the excess alkali ferrocyanide, and to precipitate therefrom a secondary white paste; oxidizing the composite white paste to form a ferric ferrocyanide type blue pigment modified with a metal selected from the group consisting of nickel and cobalt, whereby to impart high alkali resistance to the pigment.

5. Method of preparing an alkali resistant iron blue pigment which comprises preparing a first solution comprising a soluble ferrous salt and a small quantity of a soluble salt of a metal selected from the group consisting of nickel and cobalt; preparing a second solution comprising an alkali ferrocyanide in a quantity amounting to an excess of between about 5 and 20% over that required to react with all the metal ions in said first solution; adding said second solution to said first solution, to form a white precipitate, adding sulfuric acid thereto and boiling in the presence of said acid for not more than 20 minutes to precipitate therefrom a secondary white paste; oxidizing the composite white paste to form a ferric ferrocyanide type blue pigment modified with a metal selected from the group consisting of nickel and cobalt, whereby to impart high alkali resistance to the pigment.

6. An alkali resistant iron blue pigment of the character described comprising as essential ingredients an oxidized white paste of ferrous alkali ferrocyanide modified with a metal selected from the group consisting of nickel and cobalt, said paste being precipitated by sequential reactions the first comprising the step of adding a solution containing an alkali ferrocyanide in excess to a solution comprising a soluble ferrous salt and a small quantity of a soluble salt of a metal selected from the group consisting of nickel and cobalt to effect the precipitation of a first white paste and then adding sulfuric acid thereto and boiling in the presence of said acid to precipitate a secondary white paste, said resulting composite paste modified with the metal selected from the group consisting of nickel and cobalt being then oxidized into said pigment, and said pigment having such resistance to color change when subjected to an alkali material that when immersed in a 5% NaOH solution it will resist color change for as long as 25 minutes.

7. An alkali resistant iron blue pigment of the character described comprising as essential ingredients an oxidized white paste of ferrous alkali ferrocyanide modified with a metal selected from the group consisting of nickel and cobalt and with said metal present within the range of between .5 and 5%, and said white paste being precipitated by sequential reactions the first comprising the step of adding a solution containing an excess of alkali ferrocyanide to a solution comprising a soluble ferrous salt and a quantity of a soluble salt of a metal selected from the group consisting of nickel and cobalt to effect precipitation of a first white paste and then adding sulfuric acid thereto and boiling in the presence of said acid to precipitate a secondary white paste, said resulting composite paste modified with the metal selected from the group consisting of nickel and cobalt being then oxidized into said pigment, and said pigment having such resistance to color change when subjected to an alkali material that when immersed in a 5% NaOH solution it will resist color change for as long as 25 minutes.

8. Method of preparing an alkali resistant iron blue pigment which comprises preparing a first solution comprising a soluble ferrous salt and a quantity of a soluble salt of a metal selected from the group consisting of nickel and cobalt and a quantity of a soluble salt of a metal selected from the group consisting of nickel and cobalt, sufficient to yield between about .5% and 5.0% of the metal of said group in the finished pigment; preparing a second solution comprising an alkali ferrocyanide in an amount in excess of that required to react with all the metal ions in said first solution; adding said second solution to said first solution, to form a white precipitate, adding sulfuric acid thereto and boiling in the presence of said acid to precipitate therefrom additional white paste, said precipitated paste having high alkali resistance potentialities; oxidizing the composite white paste to form a ferric ferrocyanide type blue pigment modified with a metal selected from the group consisting of nickel and cobalt, whereby to impart high alkali resistance to the pigment.

9. A method of preparing an alkali resistant iron blue pigment of the character described, which comprises adding to a ferrous salt solution a small quantity of a soluble salt of a metal selected from the group consisting of nickel and cobalt, adding an excess of an alkali ferrocyanide solution to the ferrous salt solution in that order, to form a composite white paste precipitate, adding sulfuric acid thereto and boiling in the presence of said acid for a limited period to destroy the excess alkali ferrocyanide whereby the white paste thus produced comprises as essential ingredients the conjointly reacted precipitate from the original solution of the iron salt and of the salt of the group comprising nickel and cobalt, and then oxidizing said white paste to form a ferric ferrocyanide type pigment modified with a metal selected from the group consisting of nickel and cobalt, and having the high alkali resistance specified.

10. An iron blue pigment of improved alkali resistance, comprising an intimate admixture of ferric ferrocyanide particles and nickel ferrocyanide particles, the nickel ferrocyanide comprising from about 2 to 20% of the mixture.

ANDRIES VOET.